Figure 1:
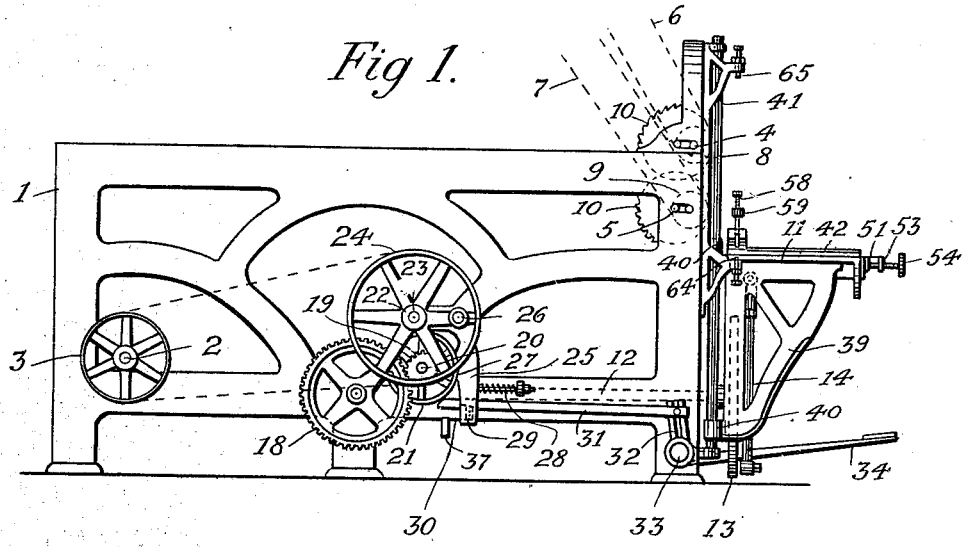

No. 669,686. Patented Mar. 12, 1901.
J. E. ERICKSON.
DOVETAILING MACHINE.
(Application filed July 24, 1899.)
(No Model.) 3 Sheets—Sheet 1.

Witnesses.
Theo. Lagaard
A. L. Whelan

Inventor
John E. Erickson
By P. H. Gunckel
his Attorney.

THE NORRIS PETERS CO., PHOTO-LITHO., WASHINGTON, D. C.

No. 669,686. Patented Mar. 12, 1901.
J. E. ERICKSON.
DOVETAILING MACHINE.
(Application filed July 24, 1899.)
(No Model.)
3 Sheets—Sheet 2.

Witnesses
Theo Lagaard
A. L. Whelan

Inventor
John E. Erickson
By P. H. Gunckel
his Attorney.

No. 669,686.  
J. E. ERICKSON.  
DOVETAILING MACHINE.  
(Application filed July 24, 1899.)  
Patented Mar. 12, 1901.
(No Model.)
3 Sheets—Sheet 3.
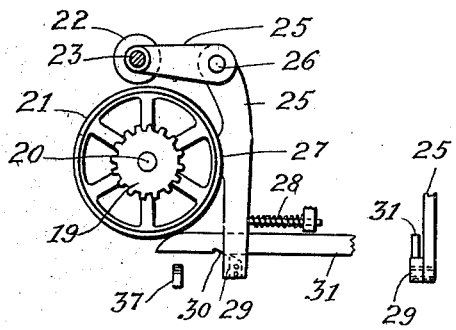
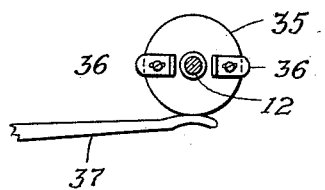
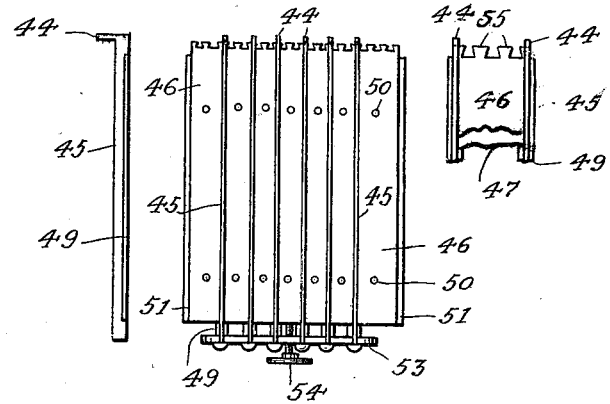
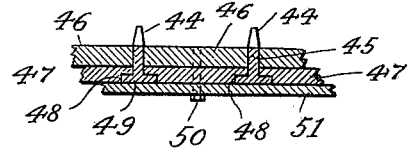
Witnesses  
Theo. Lagaard  
A. L. Whelan
Inventor  
John E. Erickson  
By P. H. Gunckel  
his Attorney.
THE NORRIS PETERS CO., PHOTO-LITHO., WASHINGTON, D. C.

UNITED STATES PATENT OFFICE.

JOHN E. ERICKSON, OF ST. PAUL, MINNESOTA.

DOVETAILING-MACHINE.

SPECIFICATION forming part of Letters Patent No. 669,686, dated March 12, 1901.

Application filed July 24, 1899. Serial No. 724,914. (No model.)

*To all whom it may concern:*

Be it known that I, JOHN E. ERICKSON, a citizen of the United States, residing at St. Paul, in the county of Ramsey and State of Minnesota, have invented certain new and useful Improvements in Dovetailing-Machines, of which the following is a specification.

My invention relates to the type of dovetailing-machines illustrated in Patent No. 535,492, issued March 12, 1895, to John Leonartson and myself, in which the dovetails or mortises with receding sides are formed in the ends of boards carried on a reciprocating table which coöperates with two sets of cutters of successively-increasing diameters. In the machine of the patent referred to the cutting of mortises was done only during the upward movement of the reciprocating table, the driving-crank making a complete revolution before stopping.

It is one of the objects of the present improvement to so organize the operating mechanisms that they will stop automatically at each half-throw of the crank, and thus enable cutting to be done at each reciprocation of the table.

A further object of the improvements is to provide devices operating automatically both to clamp the boards in place on the table during the cutting operation and release them upon completion of the cutting.

Other improvements relate to convenient means for adjustment of parts for holding boards of different thicknesses, means for adjusting the board-guides relative to the saws, and other details of structure, all of which improvements tend to greatly increase the capacity of the machine for turning out finished work.

As the purpose of the machine is to prepare boards for making boxes, and especially to enable low-grade lumber to be used for packing-boxes and other cheap boxes, the importance of such improvements as facilitate the work, increase the output, and better adapt the machine to successfully operate upon the cheaper grades of material is apparent.

The improvements are illustrated in the accompanying drawings, in which—

Figure 4:
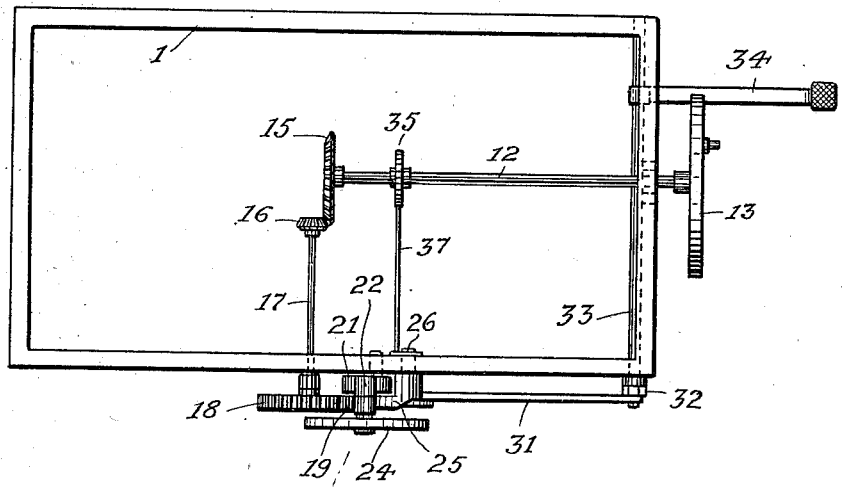
Figures 2, 3:
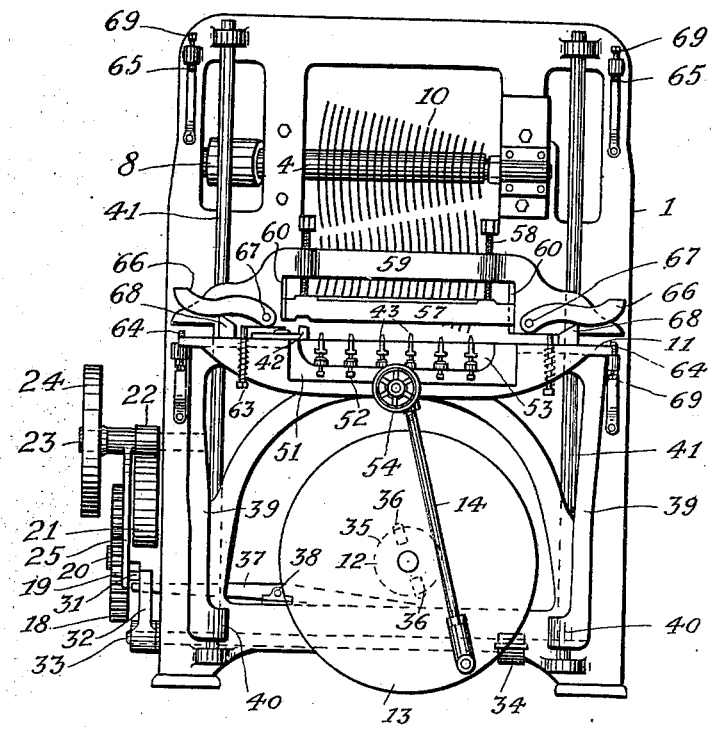

Figure 1 is a side elevation of the improved dovetailing-machine; Fig. 2, an elevation of the end of the machine at which the dovetail mortises are cut; Fig. 3, an elevation of the table shown in Fig. 2 and connections, showing the positions of parts when boards may be inserted or removed. Fig. 4 is a plan view showing in outline the general arrangement of the mechanism for reciprocating the table, and Figs. 5, 6, 7, and 8 show details of devices hereinafter set forth.

In the drawings, 1 designates the machine-frame, 2 the main driving-shaft, and 3 the pulley thereon connected with a source of power for operating the reciprocating table. The saw-arbors 4 and 5 are rotated by belts 6 and 7 on pulleys 8 and 9, connected with overhead shafting. (Not shown.) The saws 10 are circular and of successively-increasing diameters, the series forming a contour like the frustum of a cone. The several saws of the series may be separated by washers and connected in any well-known manner. These saws have their edges beveled to a common plane and are placed in such positions relative to each other and to the bed that they may cut dovetail mortises by two successive cuts, as set forth in the patent referred to.

For operating the reciprocating table 11 there is provided a central shaft 12, carrying on its outer end a crank-disk 13, connected by a pitman 14 to the table, and on the inner end of the shaft is a beveled gear 15, and in mesh with it is a beveled pinion 16 on a shaft 17, that extends laterally to the outside of the frame and there carries a gear-wheel 18. In mesh with the latter gear is a pinion 19 on a shaft 20, which carries also a friction-wheel 21, the shaft having suitable bearings on the base member of the machine-frame. Thus the rotation of the friction-wheel 21 will cause the rotation of the shafting and gearing just described, and thereby operate the pitman 14 to reciprocate the table.

For engaging the friction-wheel 21 at intervals of time to revolve it a friction-wheel 22 is provided on a shaft 23, that carries a pulley 24, which is belted to a pulley on the main driving-shaft 2, whereby the shaft 23 and the friction-wheel it carries are kept in constant rotation. The shaft 23 is mounted on the angular arm of a lever-frame 25, that is pivoted at 26 to a portion of the machine-frame and extends downward near the face of the friction-wheel 21 to a point at the side of the base of the machine-frame. On the side of the lever 25 adjacent the friction-wheel 21 is formed or secured a brake-shoe 27 for engaging that wheel to stop its revolution. A spring 28, suitably arranged and secured at the side of the frame 1, normally exerts tension against the lower portion of the lever and presses the brake against the friction-wheel 21. Movement of this portion of the lever in a direction away from the wheel serves to free the brake and at the same time, by reason of the angularity of the lever and its pivotal connection with a fixed object, swings the shaft of the friction-wheel 22 downward and brings the two friction-wheels in contact, and thus the gearing for producing reciprocation of the table is set in motion.

The lower end of the lever 25 is provided with a lug or catch 29 for engaging a notch 30 in a horizontal bar 31, that extends to the end of the machine and is pivoted to an arm 32 on a rocking rod 33, mounted transversely in the lower portion of the machine-frame. To this rod is attached a foot-lever 34 in convenient position to be operated by a workman at the end of the machine. Pressure on the foot-lever serves to actuate the bar 31 lengthwise toward the operator and by engagement of the notch 30 in the bar with the lug 29 on the lever 25 turns the latter on this pivot sufficiently to cause contact of the friction-wheels. It is obvious that so long as the friction-wheels are in contact the table reciprocations would continue; but stopping devices operating automatically at suitable intervals are provided to prevent such continuous reciprocatory movements.

On the shaft 12 is a disk 35, having at two diametrically opposite points projections 36 for engaging a lever 37 to depress it whenever the projections come in contact with it. The lever is fulcrumed at 38 to the frame 1, and its outer arm extends beneath the longitudinal bar 31 and in position to lift it when the inner end of the lever is depressed by the projections on the disk 35. This lifting of the bar 31 frees its notch 30 from the catch 29 on the friction and brake lever, and thus permits the spring 28 to exert its force against the lever to free the friction and apply the brake. As the cam projections 36 are at opposite sides of the disk, it is apparent that the operation of the mechanism they control will continue only during a half-revolution of the disk and that the succeeding cam engagement will depress the engaged lever, and thereby actuate the brake to stop further movement. To renew the operation, the foot-lever must be released and returned to its elevated position, which may be done by a spring (not shown) connected in any well-known way. When so raised, the bar 31 is again in proper position to engage the catch in the friction-carrying lever 25 upon depression of the foot-lever.

The reciprocating table 11 is supported by a bracket-frame 39, having loose sleeves 40 on vertical guide-rods 41, that extend from the bottom to the top of the frame 1, and being connected by the pitman 14 to the crank-disk 13 on the shaft 12 a throw of the crank will reciprocate the table upward on the rods 41 from the position shown in Figs. 1 and 2 to a point above the saws, as shown in Fig. 3, where it will be stopped by the brake by reason of the operation of a cam 36 on the brake connections. After a release of the foot-lever and subsequent pressure upon it the renewal of the pitman movement will retract the table to its lower position, where it will be again arrested in the same manner.

The boards to be cut can be placed in proper position on the table by means of a guide 42, that prevents lateral movement and which is adjustable laterally on the table by screws 43, that pass through slots in its base and engage the table, and other guides 44 at right angles to the former and adjacent to the saws, which limit inward movement of the boards. The latter guides are upward-tapering projections on bars 45 and are of proper size and suitably spaced to pass freely through the interstices between the saws. These bars are of T shape in cross-section, Fig. 7, and are held together in a series by intermediate upper flat strips 46 and lower strips 47, the latter having grooves 48 along their lower edges, in which the lateral flanges 49 of the bars 45 are slidable lengthwise, and these strips being clamped together by bolts 50 provide a bed for the boards, as well as furnish ways for the lengthwise adjustment of the board-guide bars 45. The series of bars and strips are placed in a frame 51. The outer end of each of the bars 45 is adjustably secured by a set-screw 52 to a movable cross-piece 53. Thus each guide-bar by freeing its set-screw may be independently removed or adjusted, and the series may be adjusted lengthwise in unison by movement of the piece 53. The latter adjustment is made by a screw engaging the frame 51 and bar 53 and operated by a nut or wheel 54. The inner ends of the strips 46 are cut away, as shown in Fig. 6, to provide projections 55, corresponding with the tongues or projections remaining on the boards when the dovetails are formed, and such projections serve as supports for the edge of the board while it is being cut to prevent portions from being broken or torn off by the saws. The adjustable table-section thus built up and its frame 51 are placed in a corresponding recess 56 in the table-bed 11.

Boards are held in place on the table by a clamping-bar 57, suspended by screws 58 from the cross-piece of a clamp-frame 59 above the table. Ways 60 are provided to guide the ends of the bar, so that its position relative to the table can be adjusted as desired by turning the screws 58 to accommodate for boards of different thickness. From the under sides of this frame rods 61 extend downward through openings in the table and carry springs 62, which bear against the under side of the table and against nuts 63 on the ends of the rods, thereby tending to draw the clamping-frame downward toward the table. Further movement of the table downward from the position shown in Fig. 2 will cause the ends of the clamp-frame to strike stops 64 on the frame 1 and remain stationary, while the table will descend to the limit allowed by the throw of the pitman 14, and so the space between the clamp-bar 57 and the table will be widened to release the board for removal. Upon the upward reciprocation similar stops 65 near the top of the frame serve to arrest the movement of the outer ends of levers 66, the inner ends of which are pivoted at 67 to the frame 59 and are intermediately fulcrumed on lugs 68, provided on the table. The obvious effect of this will be the separation of the table and clamp in the same manner as when the clamp-frame itself engages the lower stops in its downward movement. The stops 64 and 65 are adjustable upward and downward to regulate the extent of separation of the clamp and table as desired by turning the nuts 69.

To cut dovetail mortises, a board having been placed on the table with a lateral edge against the guide 42 and the inner edge against the guides 44, the clamp-bar 57 being at the time in its elevated position and the table at one or the other of its extremes of movement, a depression of the foot-lever 34 will free the brake and bring the friction-pulleys in contact and start rotation of the shaft 12. The first operative effect of such rotation is to start the table in its reciprocatory movements, the immediate result of which is to release the clamp-frame from the stops 64 or 65 and permit the clamp-bar to descend to the board and hold it in place. As the table approaches the limit of its reciprocation the stops 64 or 65 are again engaged and the clamp-bar lifted, and coincidently one of the cams 36 depresses the lever 37, and the movement of the latter releases the foot-lever connection with the brake-lever and permits the brake to be applied to the friction-wheel to stop the operating machinery and hold it in place for the removal of the board.

Having described my invention, what I claim is—

1. In a dovetailing-machine, a series of saws mounted on stationary supports, a reciprocating table provided with a central recess; a supplemental table seated in such recess and comprising a series of T-shaped bars having upturned ends between the saws to serve as board-guides, and a series of intermediate strips having projections extending between the saws to support and protect the tenons; and means for adjusting said bars and strips collectively or separately toward or away from the saws, substantially as set forth.

2. In a dovetailing-machine, the combination with a series of saws mounted on stationary supports, and a reciprocating work-table; of a pitman and crank for reciprocating said table; gearing, including an idle friction-wheel, for intermittently rotating the crank; a driving friction-wheel, a brake, and a rocking carrier therefor arranged to apply them alternately to the idle friction-wheel; an operating-lever and connections for engaging the carrier at will to bring the friction-wheels to contact; a tripping-lever for automatically releasing the connections to allow the carrier to rock in opposite direction to apply the brake; and a cam operated by the driving-gear to actuate the tripping-lever at each half-revolution of the crank, substantially as set forth.

3. In a dovetailing-machine, the combination with a series of saws mounted on stationary supports, and a reciprocating work-table; of a pitman and crank for reciprocating said table; gearing, including an idle friction-wheel, for intermittently rotating the crank; a driving friction-wheel, a brake, and a rocking carrier therefor arranged to apply them alternately to the idle friction-wheel; an operating-lever and connections for engaging the carrier at will to bring the friction-wheels to contact; a spring for rocking the carrier in opposite direction to apply the brake; a tripping-lever for automatically releasing said connections to permit the spring to so operate; and a cam operated by the driving-gear to actuate the tripping-lever at each half-revolution of the crank, substantially as set forth.

4. In a dovetailing-machine, the combination with a series of saws mounted on stationary supports, and a reciprocating work-table; of a clamp-carrying frame loosely mounted on the table; levers pivoted to said frame, fulcrums therefor provided on the table, and stops on the machine-frame for engaging the free ends of the levers to lift the clamp-frame as the table nears the end of a reciprocation; a pitman and crank for reciprocating said table; gearing, including an idle friction-wheel, for intermittently rotating the crank; a driving friction-wheel, a brake, and a rocking carrier therefor arranged to apply them alternately to the idle friction-wheel; an operating-lever and connections for engaging the carrier at will to bring the friction-wheels to contact; a tripping-lever for automatically releasing the connections to allow the carrier to rock in opposite direction to apply the brake; and a cam operated by the driving-gear to actuate the tripping-lever at each half-revolution of the crank, substantially as set forth.

In testimony whereof I have hereunto set my hand this 14th day of July, 1899.

JOHN E. ERICKSON.

In presence of—
M. F. HARRISON,
P. H. GUNCKEL.